April 30, 1968  R. J. GELINAS  3,380,302
FLOWMETER
Filed May 26, 1965
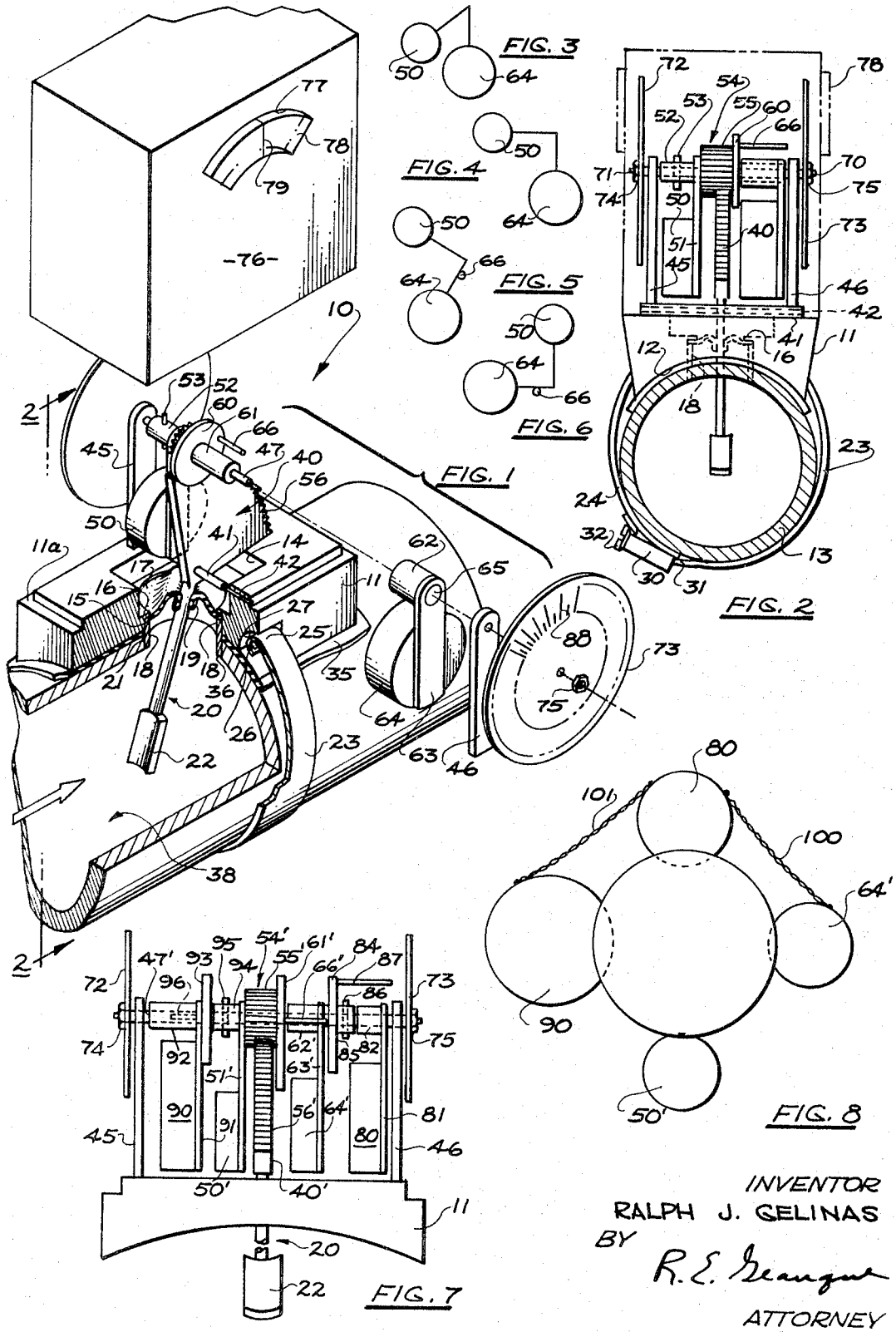
INVENTOR
RALPH J. GELINAS
BY
R. E. Geangue
ATTORNEY United States Patent Office 3,380,302
Patented Apr. 30, 1968

3,380,302
FLOWMETER
Ralph J. Gelinas, Sherman Oaks, Calif., assignor to Unicon Systems Incorporated, Van Nuys, Calif., a corporation of California
Filed May 26, 1965, Ser. No. 458,848
10 Claims. (Cl. 73—228)

ABSTRACT OF THE DISCLOSURE

A flowmeter having a pivoted arm with one end in the path of flow of a fluid and the other end geared to a shaft totatable in response to displacement of the arm due to fluid flow and providing a measure of such flow, and biasing means in the form of a plurality of pendulous weights mounted on the shaft for coaxial pivotal movement about the shaft axis and sequentially moved with rotation of the shaft for increasing bias on the arm with increase in its displacement.

---

This invention relates to a flowmeter and more particularly to a flowmeter of simplified construction which may be easily and quickly attached to a flow circuit.

Numerous types of flowmeters are available for measuring flowrate, such as the turbine type, but these flowmeters have the disadvantage of being too expensive and further cannot be readily installed and removed from a conduit for flow test purposes, such as is required in connection with swimming pool maintenance. The meter of the present invention can be easily attached to any conduit by simply providing an access hole in the conduit which will normally be plugged. The activator arm of the meter is inserted through the hole into the fluid flowing in the conduit. An adjustable strap can secure the body of the meter to the external surface of the conduit and movement of the arm activates the meter to record fluid flowrate. A plurality of pendulum weights serve as the bias against which the activator arm moves as the flowrate increases. The weights are rotated sequentially by a shaft which is geared to the activator arm so that the total torque resisting movement of the arm increases as the activator arm is moved by increased flowrate which produces increased drag on the arm. An impediment member is attached to the arm and located within the flow stream to produce the fluid drag on the arm and the impediment can be in the form of a plate oriented on the arm transversely to the flow direction. Meter means are provided to measure the amount of movement of the arm which represents a measure of flowrate and the sequence of movement of the weights produces a substantially linear increase in bias as the arm moves.

It is therefore an object of the present invention to provide a flowmeter which consists of impediment means located in a flow stream and movable against biasing weight means to provide a measure of flowrate.

Another object of the invention is to provide a flowmeter in which movement of an impediment member in which movement of an impediment in the flow stream is resisted sequentially by a plurality of pendulous weights which increase the biasing as the impediment member moves.

Another object of the invention is to provide a flowmeter which is easily and quickly attached and removed from a flow conduit and which is entirely mechanical in operation.

These and other objects of the invention not specifically set forth above will become readily apparent from the accompanying description and drawings in which:

FIGURE 1 is an expanded perspective view, partly in section, showing the initial position of the impediment with no flow through the conduit;

FIGURE 2 is a section along line 2—2 of FIGURE 1;

FIGURES 3–6 are schematic illustrations showing progressive movement of the biasing weights;

FIGURE 7 is a section similar to FIGURE 2 of a modification employing four biasing weights;

FIGURE 8 is a schematic illustration of the weights of FIGURE 7 when the dial has traversed a complete revolution.

Referring to the embodiment of the invention chosen for purposes of illustration, flowmeter 10 comprises a base block 11 having an under surface 12 curved to conform with the outer circumference of conduit 13. Base 11 contains a square top opening 14 which connects with a circular opening 15 and these openings are separated by a lip 16 extending over opening 15. A flexible rubber seal 17 has its circumferential held against lip 16 by a metal insert sleeve 18 which is press fitted into opening 15. Seal 17 has a center opening formed in center portion 19 which is secured in water tight condition to an activator arm 20 passing through the center opening. The conduit 13 contains a circular opening 21 which is substantially the same size as opening 15 so that sleeve 18 projects into opening 21 and locates body 11 on the conduit. Arm 20 projects through opening 21 into the interior of conduit 13 and the end of the arm carries an impediment 22 in the form of a curved plate.

Base 11 is attached to the conduit 13 by straps 23 and 24 each of which has an end 25 curved around a pin 26 located in a cutout 27 to provide a pivotal attachment. The strap 24 carries an adjustable fastener 30 which grips the end 31 of strap 23 and tightens the straps around the conduit by rotation of screw 32. Obviously, any suitable type of adjustable fastener means can be utilized to tighten the straps around the conduit. A gasket 35 is placed between base surface 12 and the conduit 13 to prevent fluid leakage therebetween and the gasket has an opening 36 of the same size as opening 21 and aligned therewith to permit arm 20 to pass into the flow passage 38 within the conduit.

Section gear 40 is attached to the end of arm 20 opposite plate 22 and carries a sleeve 41 projecting on opposite sides of the gear. Pin 42 passes through the gear 40 and sleeve 41 and has its ends anchored in openings in the top of base 11 in order to pivotally support activator arm 20. A pair of brackets 45 and 46 project upwardly from base 11 at opposite sides thereof and rotatively support a shaft 47 extending therebetween. Primary pendulous weight 50 is attached to one end of an arm 51 and the other end carries a hub 52 which is rigidly attached to shaft 47 by pin 53 passing through the hub and the shaft. A circular gear 54 is attached to shaft 47 at the center thereof and has teeth 55 in mesh with teeth 56 in section gear 40.

A plate 60 is secured to one side of gear 54 for rotation therewith and an enlarged shaft 61 projects to one side of plate 60. A hub 62 is attached to one end of arm 63 which carries a secondary pendulous weight 64 at the other end. The hub snugly receives enlarged shaft 61 in order to pivotally support weight 64 and shaft 47 projects through opening 65 in arm 63. A pin 66 also projects to one side of plate 60 at a location which permits the pin to pass above weight 64 and engage arm 63 after about 90 degrees clockwise rotation of gear 54 as viewed in FIGURE 1.

The shaft 47 has reduced threaded ends 70 and 71 which project through center openings in meter discs 73 and 72, respectively, and the discs are secured against shoulders at the reduced ends by nuts 75 and 74, respectively, so that the discs rotate with shaft 47. A cover member 76 surrounds the discs and the gear mechanism and has an open bottom which is retained on ledge 11a of base 11. Opposite sides of the cover member have openings 77 covered by clear plastic plates 78 on which there is a reference line 79. The discs 72 and 73 each carry a flow measuring scale 88 which rotates past reference line 79 as the discs are rotated by movement of activator arm 20.

When it is desired to measure the fluid flow rate through conduit 13, the plug (not shown) for opening 21 in the conduit is removed so that the activator arm can be inserted into the interior conduit passage 38. The gasket 35 on body surface 12 is seated against the conduit and the straps 23 and 24 are tightened to prevent escape of fluid from the conduit. This assembly operation is more easily accomplished when there is not flow or reduced flow through the conduit, although it can also be done at higher fluid flow rates. When no fluid is flowing in passage 38, the activator arm 20 is directed downwardly and upstream by primary pendulous weight 50 which assumes the vertical position shown in FIGURE 1; the activator being positioned through gears 40 and 54 and shaft 47. The secondary pendulous weight 64 also assumes a vertical position since arm 63 is not in contact with pin 66 and is free to rotate on shaft 62.

When fluid starts to flow through passage 38, a drag force is produced on plate 22 which causes the plate 22 to move against the biasing force of weight 50. As illustrated schematically in FIGURE 3, as weight 50 is rotated by the drag force, it becomes more and more offset from the vertical through shaft 47 and produces a maximum resisting torque on the shaft when it has been rotated 90 degrees (see FIGURE 4). During the first 90 degrees rotation of shaft 47 by plate 22, arm 20, gear 40 and gear 54, the biasing force increases with shaft displacement. Also, the drag force on plate 22 increases with flow rate so that shaft displacement during the first 90 degrees of shaft rotation provides a measure of flow rate on scale 88. The amount of rotation of discs 72, 73 per unit rotation of arm 20 will of course depend upon the ratio between gears 40 and 54.

At about 90 degrees of shaft rotation, pin 66 engages arm 63 of weight 64 and causes it to become more and more displaced from the shaft (see FIGURE 5) to continually increase the biasing torque on arm 22. At the same time, the weight 50 is becoming less offset from the vertical so that its biasing force is reducing. Thus, between about 90° and 180° of shaft rotation, the weight bias continues to increase since weight 64 is larger than weight 50 and predominates. In other words, the torque of weight 64 increases faster than the torque of weight 50 reduces so that scales 88 continue to record a value representing fluid flow rate through passage 38.

After 180 degrees of rotation of shaft 47 (see FIGURE 6), weight 50 will be above the shaft and produce no bias and weight 64 will be producing maximum bias. At this point, arm 20 will be at its maximum downstream position and will engage opening 21 to prevent further operation of the meter. Thus, over the complete 180° rotation of shaft 47, the meter discs will provide a reading of flow rate through conduit 38. While the bias of the weights will not be completely linear over the complete shaft movement, the bias operates to provide a flow value whose accuracy compares favorably with other types of meters.

Of course, the manner in which the bias increases with shaft rotation can be refined by adding additional weights which operate over a given shaft displacement. While the impediment is illustrated as a curved plate, various other shapes can be utilized. The movement of the arm is confined within an angle range on either side of the vertical plane so that rotation of the arm 20 does not substantially affect the torque arm between plate 22 and shaft 41. It is noted that as the arm moves from its initial position towards vertical, the increase in torque arm accompanies an increase in flow rate so that one does not cancel the other. In general, it is desirable to utilize the meter for ranges of flow rate which position the arm 20 near the vertical plane.

A modification utilizing four pendulous weights, instead of two is shown in FIGURES 7 and 8 wherein like numerals designate like parts and prime numerals designate similar parts as in the prior embodiment. The base 11 has an opening for the actuating arm 20 which carries the impediment 22 at one end and the gear 40 at the other end. The actuated arm 20 is pivotally mounted in the same manner as in the prior embodiment. Shaft 47' mounts gear 54' having teeth 55' and mesh with teeth 56' on the gear sector 40'. The shaft 47' is supported by the uprights 45 and 46 which are supported by the base plate 11 and the dials 72 and 73 are connected to the shaft 47' by nuts 74 and 75, respectively. The weight 50' is mounted on the arm 51' which is attached to one side of gear 54' for movement therewith. The other side of gear 54' carries a plate 61' from which projects pin 66'.

The second pendulous weight 64' is mounted on one end of arm 63' and the other end of the arm consists of hub 62' which is freely rotatable on shaft 47'. The pin 66' is displaced 90° from the vertical plane so that clockwise movement of gear 54' by gear 40', as viewed from dial 72 in FIGURE 7, will first rotate the weight 50' through ninety degrees and then the pin 66' will engage the arm 63' to commence rotation of the weight 64' in the same direction.

A third weight 80 is connected to one end of an arm 81 and the other end of the arm carries a hub 82 which is freely rotatable on shaft 47'. A plate 84 is secured to a hub 85 which is pinned to shaft 47' by pin 86 and the plate 84 carries a pin 87 which is displaced 180° from the arm 81. Thus, after 180° rotation of the shaft 47', the pin 87 will engage the arm 81 and start the weight 80 to move clockwise as viewed from dial 72 in FIGURE 7. At such time, the weight 50' will be in its upper most position and the weight 64' will have been displaced 90° clockwise.

A fourth weight 90 is secured to one end of an arm 91 and the other end carries a hub 92 which is freely rotatable on the shaft 47'. A plate 93 has a hub 94 which is pinned to the shaft 47' by pin 95 and the plate 93 carries a pin 96 which is displaced 270° in the clockwise direction from the arm 91. Thus, after 270° of rotation of gear 54' in the clockwise direction, as viewed from discs 72, the pin 96 will engage the arm 91 and commence to move the weight 90. After the weight 90 has moved 90°, the four weights will assume the positions shown in FIGURE 8 which is a view taken from the left side of FIGURE 7. The weight 90 will be displaced 90° in the clockwise direction, the weight 80 will be displaced 180°, the weight 64' will be displaced 270° and the weight 50' will have traveled 360°. A flexible chain 100 extends between weights 64' and 80 and a flexible chain 101 extends between weights 80 and 90 (FIGURE 8). Therefore, the dials 72 and 73 will indicate flow rate through the complete 360° rotation of the dials.

The weights 64' and 80 are connected together by flexible chain 100 which permits 90° separation of the weights and the weights 80 and 90 are connected together by flexible chain 101 which also permits 90° separation. When the weight 64' passes the upper dead center and starts downwardly, it will be held by the chain 100 and weight 80 which is being driven upwardly by the pin 87 and after the weight 80 passes the upper dead center, both the weights 64' and 80 will be held back by chain 101 and heavier weight 90 which is being driven upwardly by the pin 86. Therefore, the weights which are freely rotatable on the shaft 47' will be held in a fixed orientation regardless of whether or not they are being driven upwardly by their respective pins. When the drag of a fluid force on impediment 22 disappears, the weight 90 will downwardly return to vertical pulling weight 80 counterclockwise past upper dead center and weight 80 will then pull weight 64' counterclockwise past upper dead center. On the downward, counterclockwise movement, the weights 90, 80 and 64' engage their respective pins 96, 87, and 66' to return the dials toward zero reading. Weight 64' pulls weight 50' past upper dead center so that this weight will return to dead center to fully reset the dials. This desired biasing action and the return action result from the fact that the successively moving weights increase in size by a selected amount to produce the desired biasing function.

It is therefore apparent that any number of weights can be utilized to produce the bias acting against the impediment in order to provide a desired bias function shaft displacement. If only three weights were utilized 90° apart, the chains 100 and 101 would not be necessary since the second free weight would not pass beyond the upper dead center. However, in such a three weight system, the scale 88' would cover only 270° of the dials. It is understood that various other types of linkage could be utilized besides chains 100 and 101 for a full rotation of the shaft to provide for readings over a full scale of 360°. Also, the meter shaft can move a pointer over a fixed dial rather than moving the dial relative to a fixed index line. Various other modifications are contemplated by those skilled in the art without departing from the spirit and scope of the invention as hereinafter defined by the appended claims.

What is claimed is:

1. A flowmeter for measuring the rate of flow of a substance through a passageway comprising:
   movably mounted impediment means located within said passageway and displaceable by the drag of said substance thereon;
   measuring means for measuring the displacement of said impediment means to provide a measure of flow rate of said substance in said passageway and comprising a shaft rotated in response to displacement of said impediment means; and
   biasing means for producing a biasing force on said impediment means in a direction to resist displacement of said means and increasing with said displacement, said biasing means comprising a plurality of pendulous weights mounted on said shaft for coaxial pivotal movement and sequentially moved upon rotation of said shaft to produce said increasing bias.

2. A flowmeter for measuring the flow of fluid within a conduit comprising:
   impediment means located in said conduit;
   an actuating arm projecting through an opening in said conduit and mounting said impediment means on one end thereof;
   means for pivotally mounting said arm intermediate its ends and externally of said conduit;
   a gear segment formed on the other end of said arm;
   a meter shaft located externally of said conduit and having its ends supported thereby;
   a gear secured to said shaft and in mesh with said segment for rotating said meter shaft upon movement of said impediment means by the drag thereon produced by the fluid flowing through said conduit; and
   a plurality of weight means mounted on said shaft for coaxial pivotal movement and sequentially moved upon rotation of said shaft for producing a biasing force which resists movement of said impediment means and which increases with displacement of said impediment means.

3. A flowmeter for measuring the flow of fluid within a conduit comprising:
   impediment means located in said conduit;
   an actuating arm projecting through an opening in said conduit and mounting said impediment means on one end thereof;
   means for pivotally mounting said arm intermediate its ends and externally of said conduit;
   a gear segment formed on the other end of said arm;
   a meter shaft located externally of said conduit and having its ends supported thereby;
   a gear secured to said shaft and in mesh with said segment for rotating said meter shaft upon movement of said impediment means by the drag thereon produced by the fluid flowing through said conduit;
   a plurality of weight means sequentially moved upon rotation of said shaft for producing a biasing force which resists movement of said impediment means and which increases with displacement of said impediment means;
   said weight means comprising a first weight secured to an arm pinned to said shaft and movable immediately upon movement of said shaft and a second weight secured to an arm pendulously mounted on said shaft; and
   means rigid with said shaft and displaced from said second weight for engaging and rotating said second weight after an increment of movement of said shaft.

4. A flowmeter as defined in claim 3 wherein said rotating means comprises a pin displaced approximately 90° from the vertical plane of said second weight and engaging said second weight after approximately 90° of rotation of said shaft.

5. A flowmeter as defined in claim 2 comprising:
   body means supported by the external surface of said conduit and secured to said conduit by strap means, said body means containing an opening in alignment with said opening in said conduit means for passage of said arm; and
   flexible sealing means in said body opening and around said arm for preventing escape of said fluid while permitting movement of said arm.

6. A flowmeter for measuring the fluid flow within a conduit comprising:
   impediment means in said conduit;
   an actuating arm projecting through an opening in said conduit and mounting said impediment means on one end thereof;
   means for pivotally mounting said arm intermediate its ends and externally of said conduit;
   a gear segment formed on the other end of said arm;
   a meter shaft located externally of said conduit and having its ends supported thereby;
   a gear secured to said shaft and in mesh with said gear segment for rotating said meter shaft upon movement of said impediment means by the drag thereon produced by the fluid flowing through said conduit;
   a plurality of weight means sequentially moved upon rotation of said shaft for producing a biasing force which resists movement of said impediment means and which increases with displacement of said impediment means; said plurality of weight means comprising a first weight secured to an arm pinned to said shaft, a second weight pendulously mounted on said shaft, means for rotating said second weight after movement of said first weight; a third weight pendulously mounted on said shaft and means for rotating said third weight after movement of said first and second weights.

7. A flowmeter as defined in claim 6 having a fourth weight pendulously mounted on said shaft; and means for moving said fourth weight after said first three weights have been put in motion.

8. A flowmeter as defined in claim 6 wherein said second weight moving means moves said second weight after about 90° of shaft rotation and said third weight moving means moves said third weight after about 180° of shaft rotation.

9. A flowmeter as defined in claim 7 wherein said second weight moving means moves said second weight after about 90° of shaft rotation and said third weight moving means moves said third weight after about 180° of shaft rotation; said fourth weight moving means moving said fourth weight after about 270° rotation of said shaft.

10. A device as defined in claim 9 having flexible means for connecting said second and third weights and for connecting said third and fourth weights.

References Cited

UNITED STATES PATENTS

| | | | |
|---|---|---|---|
| 521,323 | 6/1894 | Schopper | 73—142 X |
| 673,213 | 4/1901 | Menard | 177—224 X |
| 751,018 | 2/1904 | Selley | 177—237 |
| 1,080,391 | 12/1913 | Vaughn | 177—237 |
| 1,414,388 | 5/1922 | Wilson | 73—228 X |
| 2,347,830 | 5/1944 | Kiburz et al. | 73—228 |
| 2,601,678 | 6/1952 | Beatty | 73—228 X |
| 2,765,656 | 10/1956 | Parshall | 73—228 |
| 2,939,319 | 6/1960 | Machlanski | 73—228 |
| 3,056,293 | 10/1962 | Ofner | 73—228 |

FOREIGN PATENTS

| | | |
|---|---|---|
| 242,877 | 1/1912 | Germany. |
| 279,876 | 2/1914 | Germany. |

RICHARD C. QUEISSER, *Primary Examiner.*

JAMES J. GILL, *Examiner.*

EDWARD D. GILHOOLY, *Assistant Examiner.*